United States Patent
Prasad et al.

(10) Patent No.: US 10,795,771 B2
(45) Date of Patent: Oct. 6, 2020

(54) INFORMATION HANDLING SYSTEM WITH REDUCED DATA LOSS IN BLOCK MODE

(71) Applicant: DELL PRODUCTS, LP, Round Rock, TX (US)

(72) Inventors: Parmeshwr Prasad, Bangalore (IN); Viswanath Ponnuru, Bangalore (IN); Ravishankar Kanakapura Nanjundaswamy, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 136 days.

(21) Appl. No.: 15/907,873

(22) Filed: Feb. 28, 2018

(65) Prior Publication Data

US 2019/0266053 A1  Aug. 29, 2019

(51) Int. Cl.
*G06F 11/14* (2006.01)
*G06F 1/30* (2006.01)

(52) U.S. Cl.
CPC ...... *G06F 11/1441* (2013.01); *G06F 11/1448* (2013.01); *G06F 11/1469* (2013.01); *G06F 1/30* (2013.01)

(58) Field of Classification Search
CPC .............. G06F 1/3203; G06F 11/1441; G06F 11/1448; G06F 11/1469
USPC ......................................................... 711/173
See application file for complete search history.

(56) References Cited

U.S. PATENT DOCUMENTS

| | | | | |
|---|---|---|---|---|
| 6,728,831 B1* | 4/2004 | Bridge | ................ | G06F 3/0608 711/112 |
| 7,266,724 B2* | 9/2007 | Denda | .................. | G11B 19/04 369/30.23 |
| 8,949,502 B2 | 2/2015 | McKnight et al. | | |
| 2003/0106942 A1* | 6/2003 | Ohya | ...................... | G06F 21/78 235/492 |
| 2009/0158085 A1* | 6/2009 | Kern | ................... | G06F 11/1064 714/6.13 |
| 2009/0172342 A1* | 7/2009 | Wong | .................. | G06F 12/0246 711/206 |
| 2010/0030999 A1* | 2/2010 | Hinz | ................... | G06F 12/0246 711/206 |
| 2012/0131253 A1* | 5/2012 | McKnight | ................ | G06F 1/30 710/308 |
| 2014/0281145 A1* | 9/2014 | Tomlin | ............... | G06F 12/0246 711/103 |
| 2017/0160936 A1 | 6/2017 | Chinnakkonda Vidyapoornachary et al. | | |
| 2017/0315742 A1* | 11/2017 | Christiansen | ......... | G06F 12/109 |
| 2018/0329643 A1* | 11/2018 | Kurjanowicz | ...... | G06F 9/45558 |

FOREIGN PATENT DOCUMENTS

WO    WO-2017184477 A1 * 10/2017  ........... G06F 3/0619

\* cited by examiner

*Primary Examiner* — Pierre Miche Bataille
(74) *Attorney, Agent, or Firm* — Larson Newman, LLP

(57) ABSTRACT

An information handling system includes a non-volatile memory, a central processing unit, and a memory controller. The non-volatile memory is configured in a block translation table mode, and divided into a plurality of sectors. The central processing unit writes data to the non-volatile memory by sector. The memory controller detects a power loss in the information handling system, determines a memory address of a last successful write within the non-volatile memory, stores the memory address in an used portion of the non-volatile memory, and starts a save operation.

18 Claims, 5 Drawing Sheets

INFORMATION HANDLING SYSTEM WITH REDUCED DATA LOSS IN BLOCK MODE

FIELD OF THE DISCLOSURE

The present disclosure generally relates to information handling systems, and more particularly relates to an information handling system with reduced data loss in block mode.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a non-volatile memory, a central processing unit, and a memory controller. The non-volatile memory may be configured in a block translation table mode, and divided into a plurality of sectors. The central processing unit may write data to the non-volatile memory by sector. The memory controller may detect a power loss in the information handling system, may determine a memory address of a last successful write within the non-volatile memory, may store the memory address in an used portion of the non-volatile memory, and may start a save operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
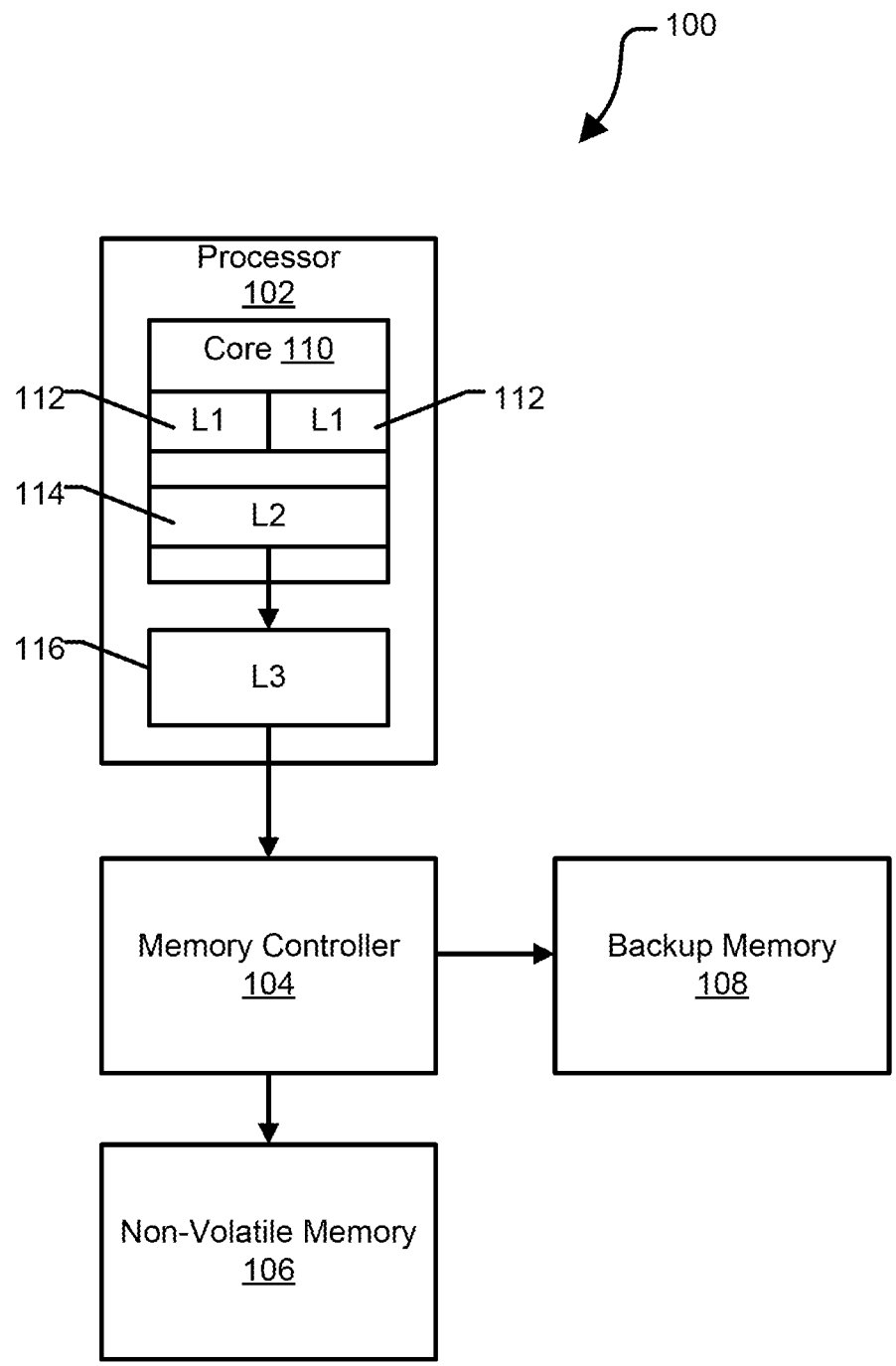
FIG. 1 is a block diagram of a portion of an information handling system according to at least one embodiment of the disclosure.

FIG. 1 shows a portion of an information handling system 100, such as a server chassis. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

FIG. 1 illustrates an information handling system 100 including a central processing unit 102, a memory controller 104, a non-volatile dual in-line memory module (NVDIMM) 106, and a memory 108. The central processing unit 102 includes a core 110, and a multiple caches includes Level 1 (L1) caches 112, a Level 2 (L2) cache 114, and a Level 3 (L3) cache. The central processing unit 102 operates to provide data processing functionality of information handling system 100, such as is typically associated with an information handling system. As such, central processing unit 102 represents a data processing apparatus, such as one or more processor cores, and the associated data input and output (I/O) functionality, such as a chipset component, and other I/O processor components. The central processing unit 102 operates to execute machine-executable code to perform the data processing tasks associated with information handling system 100.

The memory controller 104 represents a portion of a processor complex that is dedicated to the management of the data storage and retrieval from the memory devices of information handling system 100, and information handling system 100 may include one or more additional memory controllers similar to the memory controller 104, as needed or desired. The memory controller 104 may reside on a system printed circuit board, may be integrated into an I/O processor component, may be integrated with a processor on a system-on-a-chip (SoC), or may be implemented in another way, as needed or desired. The memory controller 104 operates to provide data and control interfaces to one or more DIMM, such as the NVDIMM 106 in accordance with a particular memory architecture. For example, the memory controller 104 and the NVDIMM 106 may operate in accordance with a Double-Data Rate (DDR) standard, such as a JEDEC DDR4 or DDR5 standard. The memory controller 104 can also operate to provide data to the memory 108. In an embodiment, the memory 108 can be any type of persistent memory that can be utilized as a backup memory in response to a power loss being detected for the information handling system 100.

The NVDIMM 106 represents a memory device of information handling system 100 that is packaged as a DIMM in accordance with the particular memory architecture by which the memory controller 104 operates. In an embodiment, the NVDIMM 106 may be configured in a block mode, such as a block translation table (BTT) mode as shown in FIG. 2 below, with the internal space of the NVDIMM 106 is divided into numerous sectors or namespaces.

Figure 2:
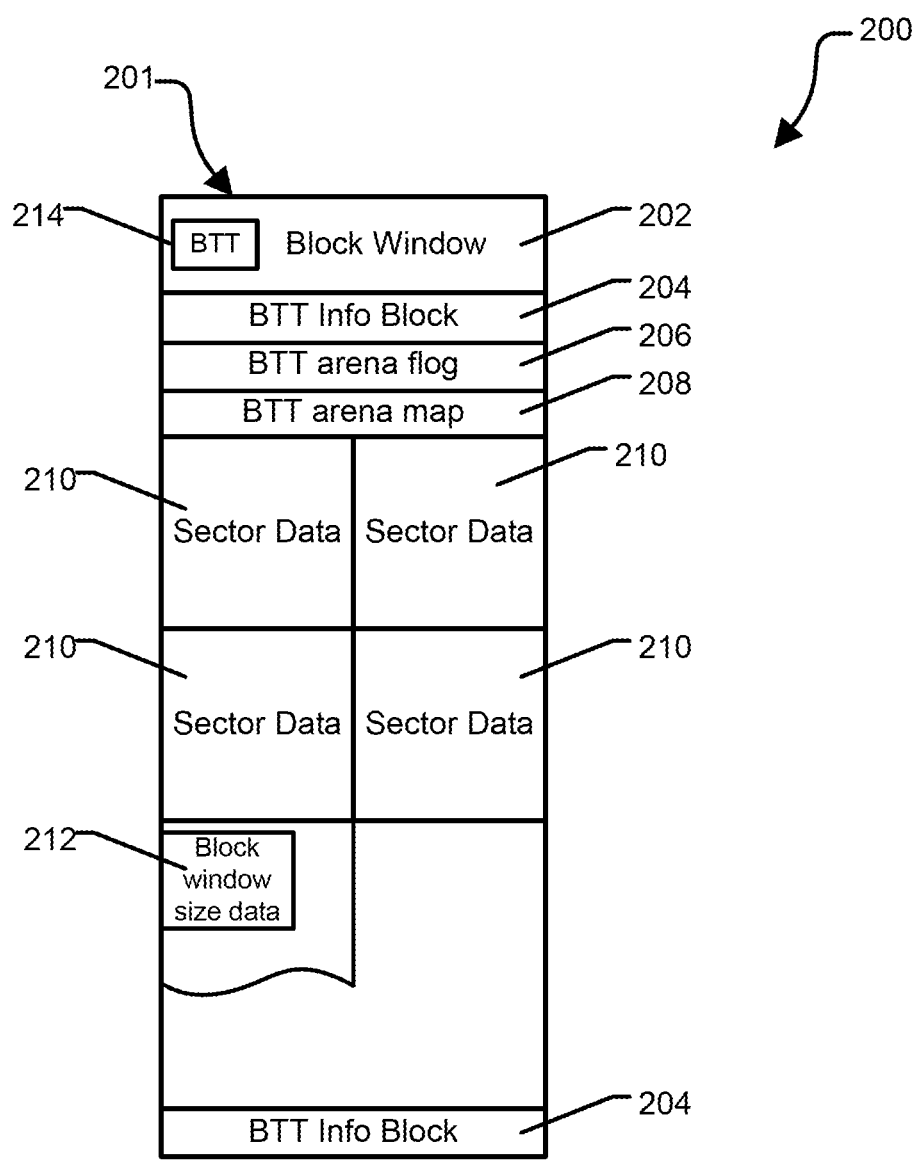
FIG. 2 is a diagram of a non-volatile memory of the information handling system configured in a block mode according to at least one embodiment of the disclosure.

FIG. 2 is a diagram of a NVDIMM 200, such as non-volatile memory 106 of the information handling system 100, configured in a block mode according to at least one embodiment of the disclosure. The NVDIMM 200 illustrated in FIG. 2 shows a single namespace 201. However, the NVDIMM 200 can include multiple namespaces without varying from the scope of this disclosure. The NVDIMM 200 namespace includes a block window 202, a BTT information block 204, a BTT arena flog 206, a BTT arena map 208, sectors of data 210. The block window 202 includes an offset range of memory locations that are unused by the NVDIMM 200 for data storage. In an embodiment, the offset range of the block window 202 can be 0-4 KB of storage within the NVDIMM 200, and the block window 202 can include a BTT 214. In an embodiment, the BTT 214 can be utilized to turn the byte-addressable memory spaces within the NVDIMM 106 into a block-organized range.

The BTT information block 204 includes data to indicate whether the block namespace 201 is used as a raw block device or as a BTT block device. The BTT arena flog 206 indicates a list of free sectors 210 of the namespace 201, and a log of used sectors 210. The BTT arena map 208 is utilized during I/O requests to map a logical block address (LBA) to an actual location within the namespace 201 of the NVDIMM 200. The sector data 210 illustrate that the data in the namespace 201 can be stored based on pre-defined data sizes, which may be larger than a block window data size 212. The block window data size 212 can be the amount of data stored in a single write.

Write operations executed by the central processing unit 102 will be discussed with respect to FIGS. 1 and 2. The BTT mode of the NVDIMM 106 can support different sector sizes, such as 512 Mb, 520 Mb, 4096 Mb, 4104 Mb, 4160 Mb, 4224 Mb, or the like. In an embodiment, the NVDIMM 106 can have multiple namespaces, and each namespace can have a different assigned sector size. The core 110 can provide an input/output (I/O) request to the memory controller 104, which in turn can determine a LBA of the NVDIMM 106 associated with the I/O request. The memory controller 104 can then create multiple requests to specific offsets within a free namespace, such as the namespace 201 in FIG. 2. The memory controller 104 can utilize the BTT arena flog 206 to determine the sectors 210 of the namespace 201 that are free for data storage. The requests can include a request to read from BTT arena map 208, and a request to write to a location, such as a particular sector 210 of FIG. 2. The namespace offset can then be converted into a NVDIMM physical address (DPA) using memory ranges within the namespace 201. Block windows within the NVDIMM 106 then perform the write operation of the I/O request.

If the information handling system 100, such as a server, experiences a power loss during a continuous write having multiple I/O operations performed simultaneously, then there is possibility of high data loss. In an embodiment, as stated above, the NVDIMM 106 is configured in a block mode and as a result any data written to a sector 210 that is not completely fill will be lost during the power failure. In this embodiment, the data written will be lost after a write operation is resumed when power is restored to the information handling system 100, because the block mode of the NVDIMM 106 will resume the write operations at a beginning address of the sector 210. Thus, there is a possibility for a large about of data to be un-constructible data when power is resumed.

In an embodiment, the data loss can more than the size of a single sector 210, such that the data from multiple sectors 210 is lost. This situation arises because the block mode of the NVDIMM 106 only enables data from a certain number of sectors 210 to be accessed after backup operation. Thus, data in the last sector(s) 210 will be a mix of corrupted data and un-constructible data. The portion of corrupt data will be minimal compare to un-constructible data. Therefore, a solution is provided to retrieve un-constructible data in the remaining sector(s) 210 and to provide backup of this data, which in turn can improve reconstruction of the data after power is resumed to the information handling system 100.

As stated above, when the NVDIMM 106 is configured in block mode data writes are performed through block window. In an embodiment, a valid block window aperture address, such as the address of the last successful write, is stored in the block window 202 in response to a power loss being detected. After a power loss is detected, the memory controller 104 can wait until a platform in the NVDIMM 106 has completed hardware address functionality, which is assigning data of a write request to an address within a sector 210. Any data assigned a hardware address, such as a DPA, is located within a durability domain of the NVDIMM 106, and anything within the durability domain can be stored within the backup memory 108 during a backup operation of the memory controller 104.

In an embodiment, the block window for the NVDIMM 106 can be a set of registers consisting of a command register, a status register, an aperture register, and the like. The block window can allow a driver of the memory controller 104 to read and write blocks of data to any persistent area or sector of the NVDIMM 106, such as sector 210 of FIG. 2. In an embodiment, the command register can include data indicating whether the current operation is a read or a write operation, the size of the data to be written or read, the block window address associated with the command, and the like. The status register can indicate whether the command is be performed, is in queue, or the like. The aperture register can include a size of sector of the NVDIMM 106, address ranges within the NVDIMM 106 that define different apertures, or the like. After the data of the write operation is in the durability domain, the memory controller 104 can access a block window command/address register mapped to namespace 201. The memory controller 104 can then read respective command register and select all block windows which were in write mode. The memory controller 104 can retrieve a last write location from the block window aperture and can associate this address with the last write.

The memory controller 104 can then calculate an offset between the last write and a last successful sector 210 that was completely written, and divide the offset by a capacity of the block window aperture block size 212. The memory controller can then determine if the last written location is in a boundary of the block window write capacity 212. If so, the address of the last written location is utilized as a memory address of a last successful write. However, if last written location is not in the boundary of block window write capacity 212, then the memory controller can move back the address to a location where the memory address is multiple of block window size 212 and utilize the address of this location as the memory address of a last successful write. In another embodiment, the memory controller 104 can receive a last successful WPQ write location or a cache line location, and utilize this location as the memory address of a last successful write.

The memory controller 104 can then store the memory address of a last successful write to the BTT 214 within the offset of the block window 202. This memory address of a last successful write can be utilized in a restore operation to identify a constructible write data location. The memory controller 104 can then store all data assigned to addresses beyond the memory address of a last successful write to the backup memory 106 during a backup save operation. In an embodiment, the backup save operation can store the data into persistent memory, such as the flash memory of the NVDIMM.

A power restore operation can then be detected within the information handling system 100. The memory controller 104 can read the memory address of a last successful write from unused portion of the block window 202, such as the offset 0 to 4 KB of the namespace 201. The memory controller 104 can retrieve the data stored within the backup memory 108, and can then perform a write operation to store the backup data within the namespace 201 being with the memory address of a last successful retrieved from the block window 202. After the restore operation is completed by the memory controller 104, the memory controller 104 can inform the user about last extended restore success through a non-volatile dual in-line memory module (NVDIMM) firmware interface table (NFIT) table.

Figure 3:
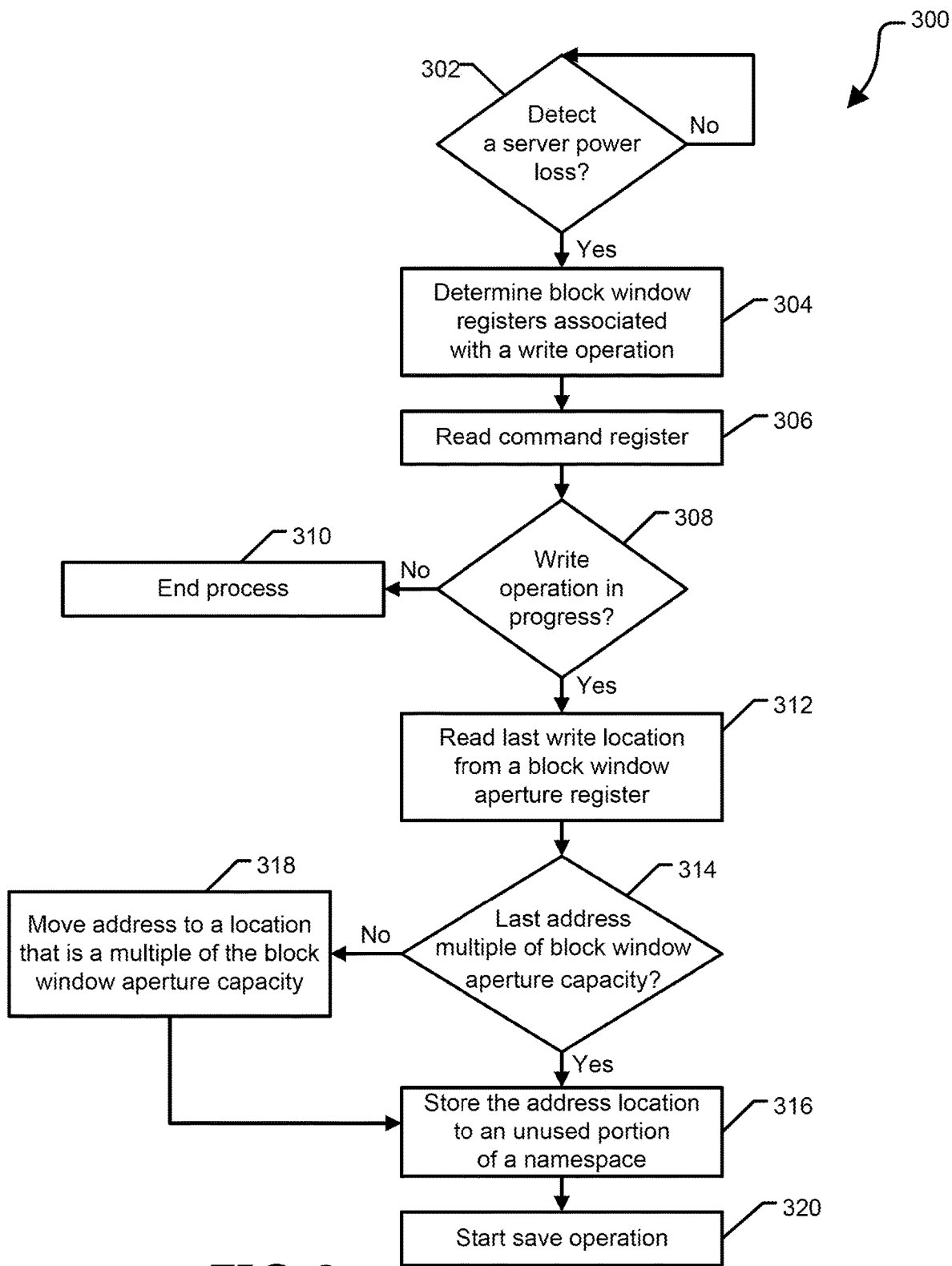
FIG. 3 is a flow diagram of a method for preventing data loss during a power loss event in the information handling system according to at least one embodiment of the present disclosure.

FIG. 3 is a flow diagram of a method 300 for preventing data loss during a power loss event in the information handling system according to at least one embodiment of the present disclosure. At block 302, a determination is made with a server power loss has been detected. When a server power loss is detected, block window registers associated with the write operation are determined at block 304. At block 306, a command register for the non-volatile memory is read. At block 308, a determination is made whether a write operation to a non-volatile memory is in progress. In an embodiment, this determination is made based on the command register. If a write operation to a non-volatile memory is not in process the flow ends at block 310. Otherwise, if a write operation to a non-volatile memory is in process, a last write location is read from a block window aperture register at block 312.

At block 314, a determination is made whether the last address is a multiple of a block window aperture capacity. In an embodiment, a block window aperture capacity is the size of a block of data written to the non-volatile memory during a single write. If the last address is a multiple of the block window aperture capacity, the address location is stored within a used portion of a namespace of the non-volatile memory at block 316. However, if the last address is not a multiple of the block window aperture capacity, the last address is moved to an address location that is a multiple of the block window aperture capacity at block 318, and the address location is stored within a used portion of a namespace of the non-volatile memory at block 316. At block 320, a save operation for data not yet written to the non-volatile memory is started. In an embodiment, the data is saved within a persistent memory. In an embodiment, the persistent memory can be the flash memory of the NVDIMM.

Figure 4:
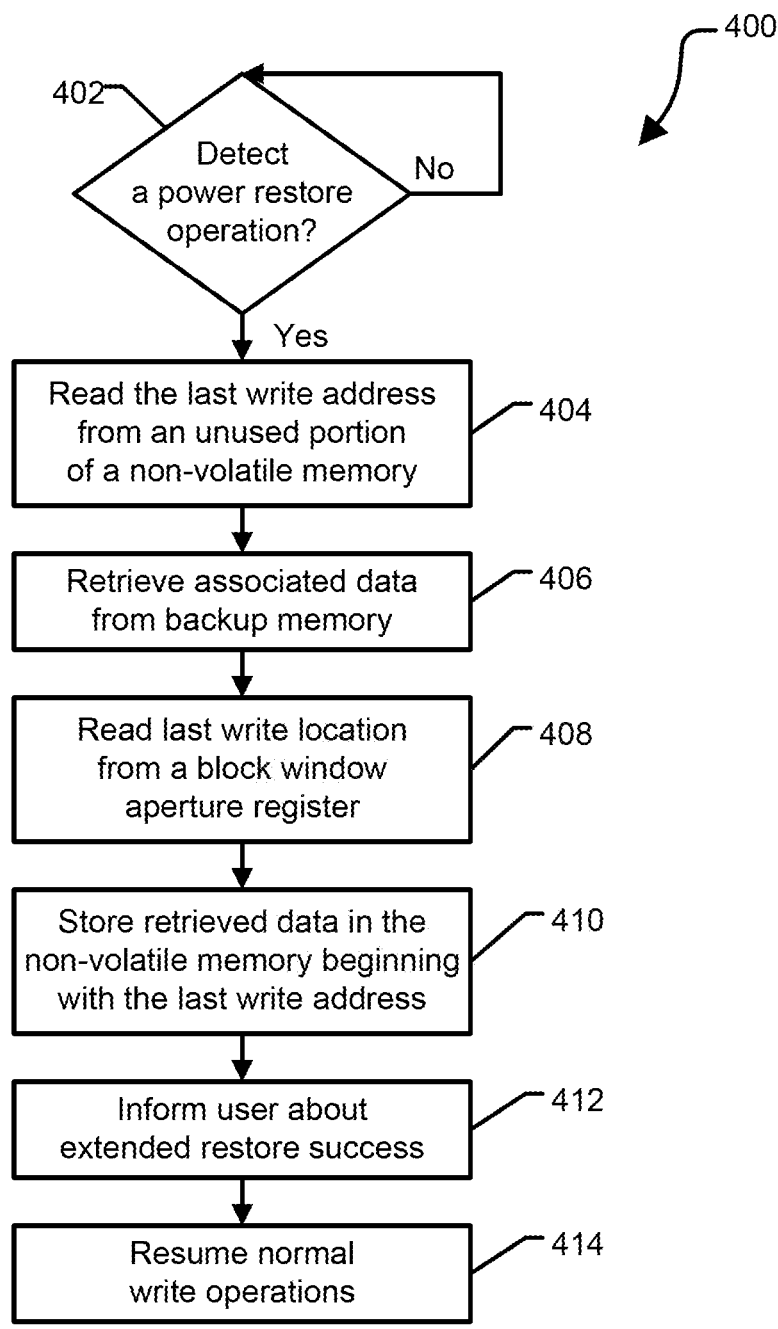
FIG. 4 is a flow diagram of a method for restoring data during a power restore operation in the information handling system according to at least one embodiment of the present disclosure.

FIG. 4 is a flow diagram of a method 400 for restoring data during a power restore operation in the information handling system according to at least one embodiment of the present disclosure. At block 402, a determination is made whether a power restore operation is detected. In response to the power restore operation being detected, a last write address is read from an unused portion of a non-volatile memory at block 404. In an embodiment, the last write address is the address of a last successful write operation to the non-volatile memory before a power loss was detected. At block 406, data associated with the last write address is retrieved from a backup memory.

At block 408, the last write location is read from a block window aperture register. At block 410, the retrieved data is stored in the non-volatile memory beginning with the last write address. A user is informed about an extended restore success at block 412. At block 414, normal write operations are resumed.

Figure 5:
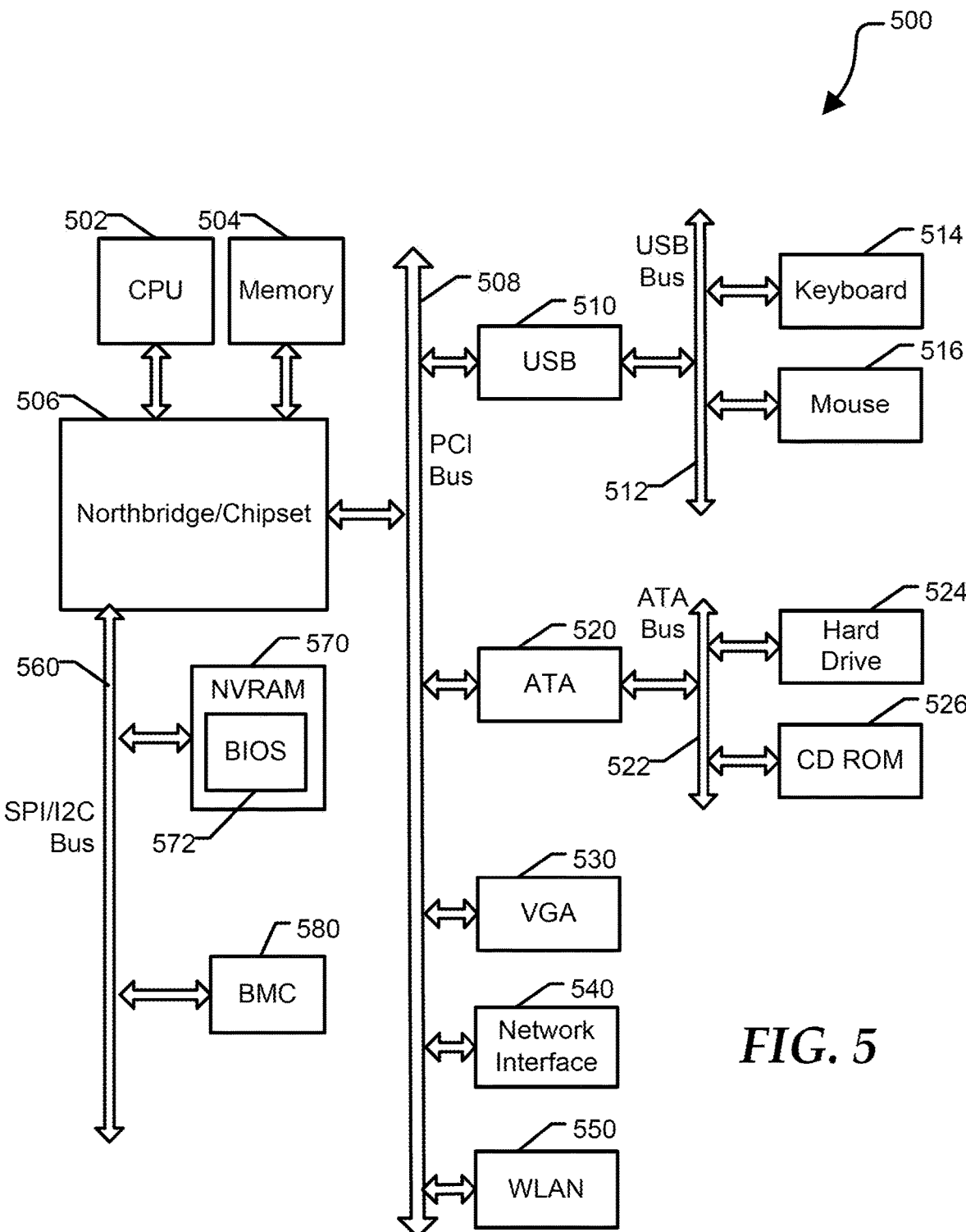
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a non-volatile memory configured in a block translation table mode, the non-volatile memory being divided into a plurality of sectors;
a central processing unit to communicate with the non-volatile memory, the central processing unit to write data to the non-volatile memory by sector of the non-volatile memory; and
a memory controller to communicate with the central processing unit and with the non-volatile memory, the memory controller to detect a power loss in the information handling system, to determine a memory address of a last successful write within the non-volatile memory, to store the memory address in an unused portion of the non-volatile memory, to start a save operation including storing of the data assigned to addresses beyond the memory address to a backup memory; to determine whether the memory address of the last successful write is a multiple of a block window size, and if the memory address is not a multiple of the block window size, to move the memory address back to a location that is a multiple of the block window size prior to the memory address being stored in the unused portion of the non-volatile memory.

2. The information handling system of claim 1, the memory controller to complete a write operation of current data into the backup memory.

3. The information handling system of claim 1, the memory controller to determine the memory address of the last successful write from a block window aperture address in a block translation table of the non-volatile memory.

4. The information handling system of claim 1, in response to a detection of a power restore operation, the memory controller to read the memory address from the unused portion of the non-volatile memory, to retrieve the respective address from the backup memory, and to store the data in respective locations of the non-volatile memory.

5. The information handling system of claim 4, the memory controller to inform a user of a last extended restore in response to the data being stored in the respective locations.

6. The information handling system of claim 5, wherein the memory controller to inform the user via a non-volatile dual in-line memory module firmware interface table.

7. A method comprising:
configuring a non-volatile memory of an information handling system in a block translation table mode;
dividing the non-volatile memory into a plurality of sectors;
performing write operations to write data to the non-volatile memory by sector;
detecting a power loss in the information handling system while the write operations are being performed;
determining a memory address of a last successful write within the non-volatile memory;
determining whether the memory address of the last successful write is a multiple of a block window size;
in response to the determination that the memory address is a multiple of the block window size, storing the memory address in an unused portion of the non-volatile memory;
starting a save operation in response to the memory address being stored in the unused portion; and
detecting a power restore operation, wherein in response to a detection of a power restore operation, the memory address is read from the unused portion of the non-volatile memory.

8. The method of claim 7, further comprising:
completing a write operation of current data into a backup memory.

9. The method of claim 7, further comprising:
reading a block window aperture address in a block translation table of the non-volatile memory to determine the memory address of the last successful write.

10. The method of claim 7, further comprising:
if the memory address is not a multiple of the block window size, moving the memory address back to a location that is a multiple of the block window size prior to the memory address being stored in the unused portion of the non-volatile memory.

11. The method of claim 7, further comprising:
retrieving the respective address from a backup memory; and
storing the data in respective locations of the non-volatile memory.

12. The method of claim 11, further comprising:
informing a user of a last extended restore in response to the data being stored in the respective locations.

13. The method of claim 12, wherein the memory controller to inform the user via a non-volatile dual in-line memory module firmware interface table.

14. A method comprising:
configuring a non-volatile memory of an information handling system in a block translation table mode;
dividing the non-volatile memory into a plurality of sectors;
performing write operations to write data to the non-volatile memory by sector of the non-volatile memory;
detecting a power loss in the information handling system while the write operations are being performed;
determining a memory address of a last successful write within the non-volatile memory;
storing the memory address in an unused portion of the non-volatile memory;
detecting a power restore operation;
in response to a detected power restore operation, reading the memory address of the last successful write from the non-volatile memory;
retrieving the respective address from a backup memory;
storing the data in respective locations of the non-volatile memory;
retrieving data within the non-volatile memory in a memory region higher than the memory address of the last successful write; and
storing the retrieved data in the non-volatile memory beginning with the memory address of the last successful write.

15. The method of claim 14, further comprising:
storing data in a cache of the processor into the backup memory.

16. The method of claim 14, further comprising:
reading a block window aperture address in a block translation table of the non-volatile memory to determine the memory address of the last successful write.

17. The method of claim 14, further comprising:
determining whether the memory address of the last successful write is a multiple of a block window size; and
if the memory address is not a multiple of the block window size, moving the memory address back to a location that is a multiple of the block window size prior to the memory address being stored in the unused portion of the non-volatile memory.

18. The method of claim 14, further comprising:
informing a user of a last extended restore in response to the data being stored in the respective locations.

* * * * *